United States Patent Office 3,576,922
Patented Apr. 27, 1971

3,576,922
THIOLOPHOSPHONAMIDES
Edmund J. Gaughan, Kensington, Calif., assignor to Stauffer Chemical Company, New York, N.Y.
No Drawing. Filed Aug. 16, 1968, Ser. No. 753,048
Int. Cl. C07f 9/24; A01n 9/36
U.S. Cl. 260—956                    10 Claims

ABSTRACT OF THE DISCLOSURE

Compounds of the formula

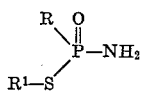

in which R is an alkyl group and $R^1$ is an alkyl, alkenyl or alkynyl group and their use in controlling weeds.

---

This invention relates to novel chemical compounds and to their use as herbicides, more particularly, the chemical compounds are certain thiolophosphonamides.

The compounds of the present invention are those having the formula

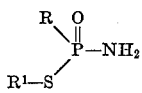

in which R is an alkyl group preferably having 1 to 4 carbon atoms and $R^1$ is a member selected from the group consisting of alkyl, preferably having 1 to 6 carbon atoms and the group $R^2$—$CH_2$— in which $R^2$ is selected from the group consisting of alkenyl, preferably having 2 to 3 carbon atoms and alkynyl, preferably having from 2 to 3 carbon atoms.

The compounds of the present invention are phytotoxic and particularly useful as herbicides.

The herbicidal properties of the compounds of the present invention is quite unexpected, especially in light of the fact that certain related compounds, such as the certain phosphoroamidothioate of South African Pat. No. 660,693 or Netherlands Pat. No. 6612670, are not useful as herbicides.

The compounds of the present invention can be prepared by the following reactions:

(1) 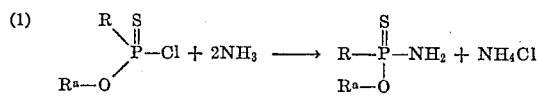

(2) 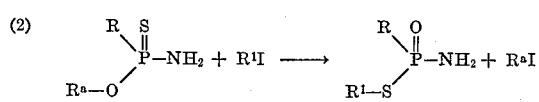

in which R and $R^1$ are as previously defined and $R^a$ is a lower alkyl group preferably having 1 to 6 carbon atoms.

Preferably, reaction number 1 is carried out in a solvent with stirring by passing 2 moles of ammonia or a slight excess thereof into a mole of the phosphonochloride thioate at a temperature of about 10 to 15° C. The intermediate reaction product can be recovered by removing the ammonium chloride precipitate by filtration and the solvent by vacuum at temperature up to about 65° C.

Preferably, reaction number 2 is carried out by refluxing the thiophosphonamide obtained from reaction number 1 or from another source with the stated iodide compound for several hours. The thiolophosphonamides of this invention can be recovered from the reaction mixture and purified by conventional means.

Preparation of the compounds of this invention is illustrated by the following examples:

EXAMPLE 1

O,P-diethylthiophosphonamide

O-ethyl ethyl phosphonochloride thioate (17.3 g., 0.1 mole) is dissolved in 85 ml. of toluene and ammonia (approximately 4.3 g., approximately 0.25 mole) is passed in at 10–15° with stirring. A precipitate of ammonium chloride appears. The mixture is filtered and the solvent is removed in vacuo up to 65°. The residual oil weighs 12.7 g. (81%). Its IR spectrum shows bonds characteristic of NH and P—O—C bonds, $N_D^{30}$ 1.5056.

EXAMPLE 2

P-ethyl-S-methylthiolophosphonamide

The above thiophosphonamide (12.7 g., 0.081 mole) and methyl iodide (13.5 ml., 0.22 mole) are refluxed for five hours. Some solid forms which is removed by filtration. The filtrate is evaporated in vacuo up to 60° and the viscous residue taken up in a mixture of 50 ml. of methylene chloride and 14 ml. of hexane. No further solid is precipitated, so the solvent is removed in vacuo up to 60°. The product, a viscous oil, shows a band at 1175 cm. (strong) attributable to hydrogen bonded P—O bond. A strong hydrogen-bonded NH band was also present, $N_D^{30}$ 1.5507. The yield is 10.5 g. (82.7%).

EXAMPLE 3

P,S-diethylthiolophosphonamide

The thiophosphonamide of Example 1 (22.3 g., .146 mole) and ethyl iodide (60.1 g., .39 mole) are stirred and heated to 70–75° (bath temperature) for five hours. The ethyl iodide is removed in vacuo and the residue is taken up in a mixture of 95 ml. of methylene chloride and 25 ml. of hexane. No solid forms and the solvents are evaporated in vacuo. The residue is pumped out at .8 mm. up to 50°. It crystallizes upon standing and is recrystallized from cyclohexane containing a little benzene, M.P. 44–46.5°. The yield is 16.7 g. The IR spectrum showed the expected bands.

*Analysis.*—Calculated for $C_4H_{12}NOPS$ (percent): C, 31.37; H, 7.84; N, 9.15. Found (percent): C, 30.75; H, 7.72; N, 8.60.

EXAMPLE 4

P-ethyl-S-n-propylthiolophosphonamide

The thiophosphonamide of Example 1 (22.2 g., .145 mole) and n-propyl iodide (59.5 g., .35 mole) are warmed at 80° (bath temperature) for eight hours. Excess iodide is removed in vacuo and the residue taken up in 112 ml. of methylene chloride and 28 ml. of hexane. No solid appears and the solvents are evaporated in vacuo. The produce is recrystallized from benzene-cyclohexane, M.P. 44–49°. The yield is 18.4 g. (82.9%). The expected bands are present in the IR spectrum.

*Analysis.*—Calculated for $C_5H_{14}NOPS$ (percent): C, 35.93; H, 8.38. Found (percent): C, 35.47; H, 8.11.

The following is a table of certain selected compounds that are preparable according to the procedure described hereto. Compound numbers are assigned to each compound and are used throughout the remainder of the application:

TABLE I $$\begin{array}{c} R \\ \diagdown \\ R^1-S \end{array} \begin{array}{c} O \\ \parallel \\ P-NH_2 \end{array}$$

| Compound Number: | R | R¹ |
|---|---|---|
| 1 [a] | Ethyl | Methyl |
| 2 [b] | do | ethyl |
| 3 | methyl | methyl |
| 4 | n-butyl | Do. |
| 5 | ethyl | isopropyl |
| 6 [c] | do | n-propyl |
| 7 | methyl | hexyl |
| 8 | ethyl | allyl |
| 9 | methyl | $CH_2=CH-CH_2-CH_2$ |
| 10 | ethyl | $CH_3-CH=CH-CH_2-$ |
| 11 | do | $CH\equiv C-CH_2-CH_2-$ |
| 12 | do | $CH\equiv C-CH_2-$ |
| 13 | do | $CH_3-C\equiv C-CH_2-$ |

[a] Prepared in Example 2.
[b] Prepared in Example 3.
[c] Prepared in Example 4.

The following tests illustrate utility of the compounds as herbicides.

As previously mentioned, the herein described novel compositions produced in the above-described manner are phytotoxic compounds which are useful and valuable in controlling various plant species. Selected compounds of this invention were tested as herbicides in the following manner:

Pre-emergence Herbicide Test.—The seeds of pigweed (Amaranthus retroflexus (L.)), and mustard (Brassica juncea (L.) cross.) were planted in individual rows one-half inch deep in Santa Cruz sandy loam soil contained in compressed paper flats. Enough seeds were planted to give about thirty to fifty plants, each of the weed species in each flat. The flats were watered after planting. The following day, each flat was sprayed at the rate of 20 pounds of the candidate compound under test in 80 gallons of solution per acre. An atomizer was used to spray the solution on the soil surface. The flats were placed in a greenhouse at 80° F. and watered regularly. Two weeks later, the degree of weed control was determined by comparing the amount of germination and growth of each weed in the treated flats with the weeds in several untreated control flats. The results of the pre-emergence herbicide test are shown in Table II.

TABLE II.—PRE-EMERGENCE ACTIVITY *
[Rate, 20 lbs./A.]

| | Pigweed | Mustard |
|---|---|---|
| Compound Number: | | |
| 1 | ++ | ++ |
| 2 | +++ | ++ |
| 5 | ++ | +++ |
| 6 | +++ | +++ |
| 8 | + | ++ |

* −=No injury.
+=Slight injury.
++=Moderate injury.
+++=Severe injury or death.

Post-emergence Herbicide Test.—The seeds of crab grass (Digitaria sanguinalis (L.) Scop.), red oats, (Avena sativa (L.)) curly dock (Rumex crispus, (L.)) and pinto bean (Phaseolus vulgaris) were planted in individual rows in Santa Cruz sandy loam soil as described in the pre-emergence test. After growing for two weeks under greenhouse conditions, the plants were four to six inches tall. Thereafter, the candidate test compound was applied to the foliage by means of an overhead spray while the flat moved under the spray on a moving table. A concentration of 0.5% of active compound in the spray was used at a rate equivalent to approximately 12.5 lbs./acre. Two weeks after treatment, the injury results were recorded using a similar rating system as used in the pre-emergence test. Table III lists the results obtained therefrom.

TABLE III.—POST-EMERGENCE ACTIVITY *
[Rate, 12.5 lbs./A.]

| | Crab grass | Red oats | Curly dock | Pinto bean |
|---|---|---|---|---|
| Compound Number: | | | | |
| 1 | +++ | − | + | +++ |
| 2 | − | + | + | − |
| 5 | + | + | + | +++ |
| 6 | +++ | + | ++ | +++ |
| 8 | ++ | + | ++ | +++ |
| 12 | +++ | + | ++ | +++ |

* −=No injury.
+=Slight injury.
++=Moderate injury.
+++=Severe injury or death.

The compounds of the present invention are useful as pre-emergency or post-emergence herbicides and can be applied in a variety of ways at various concentrations. They may be combined with suitable carriers and applied as dusts, sprays, or drenches. The amount applied will depend upon the nature of the weeds or plants to be controlled and the rate of application may vary from 1 to 80 pounds per acre. One particularly advantageous way of applying the compounds is as a narrow band along a row crop, straddling the row. It is not necessary that the phytotoxic compositions be admixed with the soil particles and these compositions can be applied merely by spraying or sprinkling the surface of the soil. The phytotoxic compositions of this invention can also be applied to irrigation water supplied to the field to be treated. This method of application permits the penetration of the compositions into the soil as the water is absorbed therein. Dust compositions, granular compositions or liquid formulations applied to the surface of the soil can be distributed below the surface of the soil by conventional means such as discing, dragging or mixing operations.

The phytotoxic compositions of this invention can also contain other additaments, for example, fertilizers, pesticides and the like, used as adjuvant or in combination with any of the above-described adjuvants. Other phytotoxic compounds useful in combination with the above-described compounds include, for example, 2,4-dichlorophenoxyacetic acids, 2,4,5-trichlorophenoxyacetic acid, 2-methyl-4-chlorophenoxyacetic acid and the salts, esters, and amides thereof; triazine derivatives, such as 2,4-bis (3-methoxypropylamino)-6-methylthio-S-triazine; 2-chloro-4-ethylamino-6-isopropylamino-S-triazine, and 2-ethylamino-4-isopropylamino-6 - methylmercapto - S-triazine, urea derivatives, such as 3-(3,4-dichlorophenyl)-1,1-dimethyl urea and 3-(p-chlorophenyl)-1,1-dimethyl urea and acetamides such as N,N-dially--chloroacetamide, N-(α-chloroacetyl) hexamethylene imine, and N,N-diethyl-α-bromoacetamide, and the like; benzoic acids such as 3-amino-2,5-dichlorobenzoic; and thiocarbamates, such as S-propyl dipropylthiocarbamate; S-ethyl-dipropylthiocarbamate, S-ethyl-cyclo-hexyl-ethyl-thiocarbomate, S-ethyl hexahydro-1H-azepine-1-carbothioate and the like. Fertilizers useful in combination with the active ingredients include for example, ammonium nitrate, urea and superphosphate. Other useful additaments include materials in which plant organisms take root and grow such as compost, manure, humus, sand and the like.

The concentration of a compound of the present invention, constituting an effective amount in the best mode of administration in the utility disclosed is readily determinable by those skilled in the art.

I claim:
1. A compound of the formula

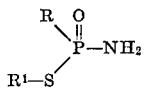

in which R is an alkyl having 1 to 4 carbon atoms and $R^1$ is a member selected from the group consisting of alkyl having 1 to 6 carbon atoms and the group $$R^2-CH_2-$$

in which $R^2$ is selected from the group consisting of alkenyl having 2 to 3 carbon atoms and alkynyl having from 2 to 3 carbon atoms.

2. The compound of claim 1 in which $R^1$ is alkyl.

3. The compound of claim 1 in which $R^1$ is the group $R^2-CH_2-$ in which $R^2$ is alkylnyl.

4. The compound of claim 1 in which $R^1$ is the group $R^2-CH_2-$ in which $R^2$ is alknyl.

5. The compound of claim 2 in which R is ethyl and $R^1$ is methyl.

6. The compound of claim 2 in which R is ethyl and $R^1$ is ethyl.

7. The compound of claim 2 in which R is ethyl and $R^1$ is isopropyl.

8. The compound of claim 2 in which R is ethyl and $R^1$ is n-propyl.

9. The compound of claim 3 in which R is ethyl and $R^1$ is allyl.

10. The compound of claim 4 in which R is ethyl and $R^1$ is propargyl.

References Cited

UNITED STATES PATENTS 3,309,266   3/1967   Magee _____ 260—959X

CHARLES B. PARKER, Primary Examiner

A. H. SUTTO, Assistant Examiner

U.S. Cl. X.R.

71—8.7; 260—982, 984, 989

PO-1050
(5/69)

UNITED STATES PATENT OFFICE
CERTIFICATE OF CORRECTION

Patent No. 3,576,922      Dated April 27, 1971

Inventor(s) EDMUND J. GAUGHAN

It is certified that error appears in the above-identified patent and that said Letters Patent are hereby corrected as shown below:

Column 4, line 17, the word "pre-emergency" should read ---pre-emergence---.

Column 5, line 9, the word "alkylnyl" should read ---alkenyl---.

Column 5, line 11, the word "alknyl" should read ---alkynyl---.

Signed and sealed this 28th day of December 1971.

(SEAL)
Attest:

EDWARD M. FLETCHER, JR.
Attesting Officer

ROBERT GOTTSCHALK
Acting Commissioner of Pate